(12) United States Patent
Hamilton

(10) Patent No.: US 10,442,156 B2
(45) Date of Patent: Oct. 15, 2019

(54) MICROCLIMATE CONTROLING SUBSTRATE

(71) Applicant: Suzanne Hamilton, Portland, OR (US)

(72) Inventor: Suzanne Hamilton, Portland, OR (US)

( * ) Notice: Subject to any disclaimer, the term of this patent is extended or adjusted under 35 U.S.C. 154(b) by 132 days.

(21) Appl. No.: 15/801,270

(22) Filed: Nov. 1, 2017

(65) Prior Publication Data

US 2019/0126592 A1 May 2, 2019

(51) Int. Cl.

| | |
|---|---|
| *A01K 13/00* | (2006.01) |
| *B32B 5/06* | (2006.01) |
| *B32B 5/26* | (2006.01) |
| *B32B 3/06* | (2006.01) |
| *B32B 3/26* | (2006.01) |
| *B32B 27/08* | (2006.01) |
| *B32B 27/12* | (2006.01) |
| *B32B 27/18* | (2006.01) |
| *B32B 27/34* | (2006.01) |
| *B32B 27/36* | (2006.01) |
| *B32B 5/02* | (2006.01) |

(52) U.S. Cl.
CPC .............. *B32B 5/26* (2013.01); *A01K 13/006* (2013.01); *B32B 3/06* (2013.01); *B32B 3/266* (2013.01); *B32B 5/022* (2013.01); *B32B 5/024* (2013.01); *B32B 5/028* (2013.01); *B32B 5/06* (2013.01); *B32B 27/08* (2013.01); *B32B 27/12* (2013.01); *B32B 27/18* (2013.01); *B32B 27/34* (2013.01); *B32B 27/36* (2013.01); *B32B 2255/02* (2013.01); *B32B 2255/10* (2013.01); *B32B 2255/205* (2013.01); *B32B 2255/26* (2013.01); *B32B 2262/0253* (2013.01); *B32B 2262/0261* (2013.01); *B32B 2262/0292* (2013.01); *B32B 2264/108* (2013.01); *B32B 2307/302* (2013.01); *B32B 2307/581* (2013.01); *B32B 2307/726* (2013.01); *B32B 2307/728* (2013.01); *B32B 2307/7265* (2013.01); *B32B 2307/758* (2013.01); *B32B 2437/00* (2013.01)

(58) Field of Classification Search
None
See application file for complete search history.

(56) References Cited

U.S. PATENT DOCUMENTS

| | | | | |
|---|---|---|---|---|
| 4,845,862 | A * | 7/1989 | Phillips, Jr. | A43B 1/14 36/83 |
| 5,415,924 | A * | 5/1995 | Herlihy, Jr. | A41D 31/02 442/35 |
| 6,272,684 | B1 * | 8/2001 | Shih | A41D 31/102 2/87 |
| 2012/0276332 | A1 * | 11/2012 | Conolly | C23C 14/562 428/138 |

\* cited by examiner

*Primary Examiner* — Daniel J Colilla
(74) *Attorney, Agent, or Firm* — Mark S. Hubert

(57) ABSTRACT

A substrate for construction of an article of clothing for a fur covered pet made of a series of layers of specialized fabric assembled in a specific configuration so as to impart synergistic cooling and heating properties to the animal's microclimate. The various fabrics are engineered to have a specialized function that they impart, such that when combined, their various properties allow the control of the temperature and humidity of the volume of air between the animal's skin and the article of clothing, thus aiding in keeping the animal from overheating or freezing.

11 Claims, 6 Drawing Sheets

MICROCLIMATE CONTROLING SUBSTRATE

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to a substrate for the construction of a garment for an animal, and more particularly to the technology in fabric design for dog clothing so as to control the microclimate between the animal's skin and the worn garment.

BACKGROUND

Dogs and cats don't have pores dispersed in their skin through which they can sweat to reduce their body temperature. Thus, water cannot exit their body through their skin in the form of sweat water to lie on the surface of their skin where it can evaporate and cool them by removing heat via the latent heat of vaporization. This is a problem for dogs with long fur coats that have been placed in a more temperate climate than where their breed arose. Commonly, these dogs are prone to heat stroke when subject to elevated ambient temperatures for extended periods of time. Similarly, dogs with thinner fur coats that have been placed in colder climates that where their breed arose have trouble getting warm.

Henceforth, an improved animal garment substrate that would enhance both the cooling or heating capability of a fur covered pet would fulfill a long felt need in the pet accessories industry. This new invention utilizes and combines known and new technologies in a unique and novel configuration to overcome the aforementioned problems and accomplish this.

BRIEF SUMMARY

In accordance with various embodiments, a pet garment substrate capable of controlling the microclimate adjacent an animal's skin is provided.

In one aspect, an integrated, multi-layer garment substrate with improved microclimate controlling capabilities for a fur-covered pet is provided. In various embodiments, the garment may aid in the cooling of the animal while in other embodiments it may aid in heating the animal.

In another aspect, a multi-layered fabric is provided, capable of being made into an article of clothing for a fur covered animal, wherein the fabric materials are layered in a synergistic manner to accomplish heating and cooling effects greater than the sum of any of the individual capabilities of the combined materials.

In another aspect a microclimate controlling substrate for the construction of a garment that cools the wearer by passing rejected heat from the wearer to the atmosphere through a multi layered fabric that utilizes a continual cycle of phase change recondensation and reabsorbtion of a central layer of water.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

Figure 1:
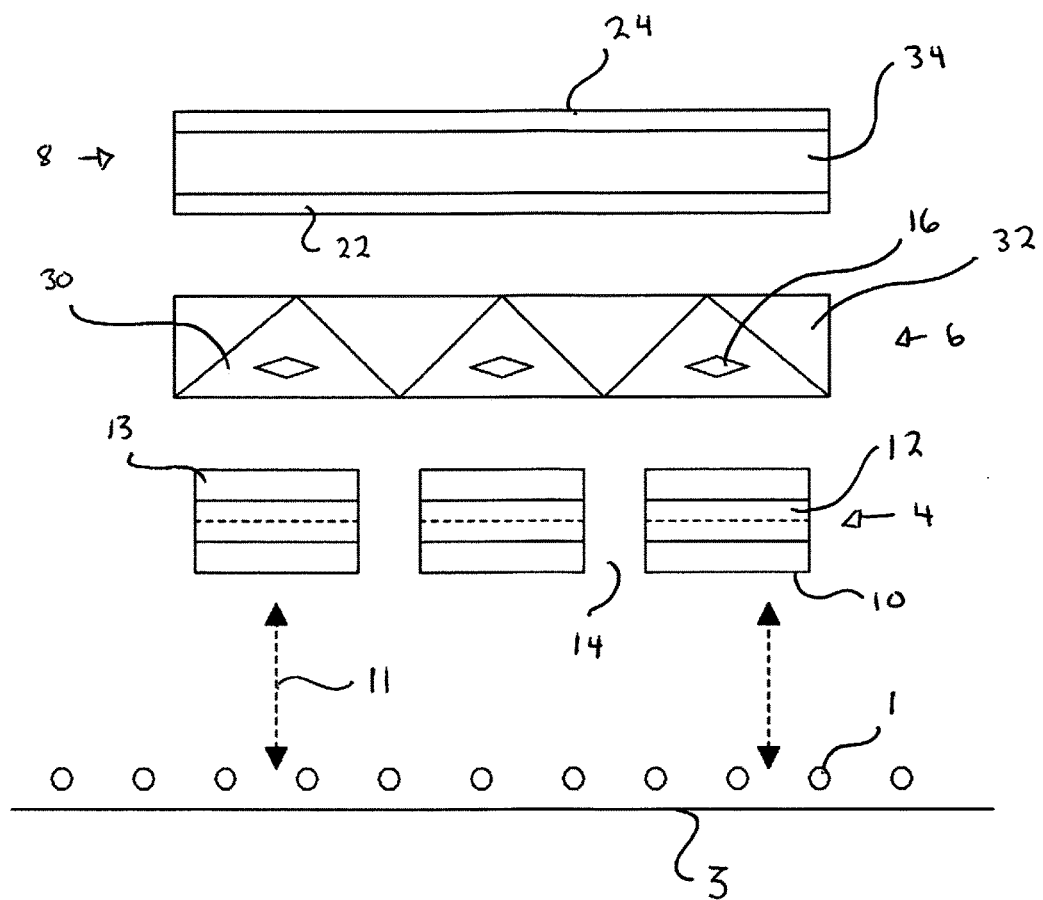
FIG. 1 is a side exploded cross sectional view of the pet microclimate controlling substrate layers positioned above an animal's fur.

While various aspects and features of certain embodiments have been summarized above, the following detailed description illustrates at least on exemplary embodiment in further detail to enable one skilled in the art to practice such an embodiment. The described example is provided for illustrative purposes and is not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. While various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As used herein the term "microclimate" refers to the volume of space directly adjacent the skin of and animal bounded by the inner layer of the pet garment. It involves both the temperature and humidity aspects, of this volume.

The present invention relates to a novel design for a pet garment substrate/fabric that is primarily intended to cool a dog. The garment substrate has three and optionally four different fabric layers, each having identical areas and geometric configurations, and each imparting a specific characteristic, although when combined in the described fashion there is a synergistic cooling effect of the layer combination. When made into a garment for a pet or human, the garment is first soaked in water then affixed to the animal or person. The various layers each perform a function that synergistically cools and minimizes any odors. The substrate allows the animal or person to be cooled without wetting the animal's coat or the person's skin. (This is an important feature when showing a animal as their coats must not be wet.) Basically, it is a microclimate controlling substrate for the construction of a garment that cools the wearer by passing rejected heat from the wearer to the atmosphere through a multi layered fabric that utilizes a continual cycle of phase change, recondensation and reabsorption of a central layer of water so as to transfer the heat from the wearer, maintain a cooled microclimate and control odors.

The operational theory is to place a damp fabric coat onto an animal such as a dog that will lie adjacent the animal's coat, but slightly spaced above the dog's skin so as to create an air layer there between the skin and the fabric substrate in which a microclimate of temperature and humidity will be created. This microclimate will be adjusted by properties from the other layers of the fabric coat. In doing such, the fabric substrate will not allow any moisture to wick down into the pet's fur, and will draw heat from the skin surface of the animal. The substrate fabric relies on heat transfer and phase change to reduce the temperature of the microclimate between the animal's skin 3 and the substrate fabric's first layer 4, so as to control the skin temperature of the dog. If used in a dry condition the fabric coat will create a different microclimate that prevents the escape of body heat from the dog.

Figure 2:
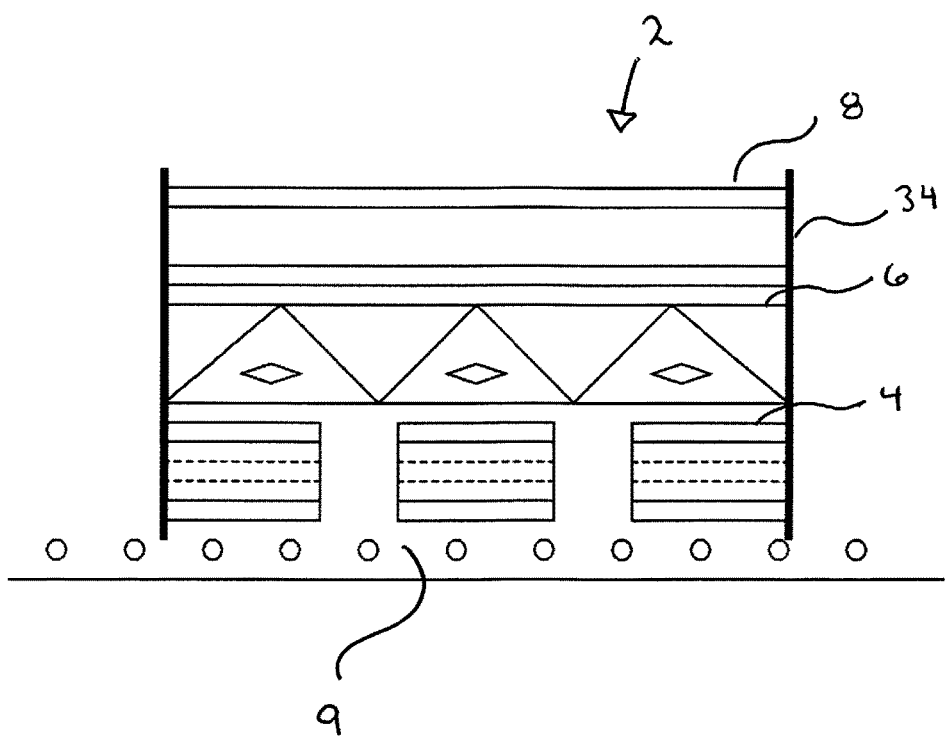
FIG. 2 is a side cross sectional view of the pet microclimate controlling substrate atop of an animal's fur as it would be in use.

FIG. 1 illustrates the layers of the preferred embodiment substrate separated and suspended at a distance 11 from its operating location. FIG. 2 shows the layers assembled into the substrate and placed in its operating position. Looking at FIGS 1 and 2, it can be seen that the innermost, first layer 4 of the substrate 2 is a polymer fabric having a smooth, lower inner face 10 for wicking, a porous polymer central core 12 and an outer, upper mesh layer 13 superimposed onto each other. The central core 12 has approximately 4500 mesh openings per square inch although larger and less openings down to a mesh size of 3000 is anticipated. There is an evenly spaced repeating array of pores 14 formed there through this first layer 4. The pores 14 have an oval configuration approximately ⅛" by 1/16". The material is preferably and 100% polyester or 100% nylon.

The second, middle layer 6 of the substrate is a hydrophilic fiber poly yarn. (Preferably a polyurethane or ePTFE fiber.) In the preferred embodiment approximately only a first half 30 of the poly yarn (56%) is infused with "activated" carbon particles 16 from coconut shells (and optionally volcanic ash 18). The second half (44%) is the same type of poly yarn that has not been treated. The two halves are woven together to form a seamless combination weave. The weave is of a tight mesh weave. The activated refers to the fact that the carbon is active to cause chemical or physical reactions on its surface. The activated carbon particles 16 are applied to the first half woven poly yarn as a waterproof, breathable membrane and remain trapped within the fibers of the poly yarn and cannot escape. An example of this product and process of making is seen in U.S. Pat. No. 8,945,287, the disclosure of which is hereby incorporated in its entirety by reference herein. These trapped particles, although only in approximately one half of the woven fabric, impart several characteristics to this fabric layer. First, the activated carbon has an extremely large surface area (800 times greater than that of the poly yarn alone) because of its geometric configuration allowing it to act as an excellent surface for evaporation of water. Second, because of its high number of pores, the activated carbon particles 16 allows it to draw in moisture and act as an excellent medium for trapping odor particles, bacteria and microbes.

The outermost, third layer 8 of the substrate has a nonporous core 34 of 200 to 210 D nylon 20 formed in an oxford weave. This weave creates a smooth outer face and the thickness of the nylon allows for a high thermal conductivity between its inner and outer faces (through its body) with the ambient air. The bottom face 22 of this core 34 has a 0.5 mm polyurethane coating that has been applied by rolling. This forms an inner, first water impermeable layer. The top face 24 of this core 34 has a water-resistant surface treatment applied by spraying thereto by a method know as KISS misting. This allows the outer face to be both water resistant and abrasion resistant, and to attain the temperature of the ambient air.

Figure 3:
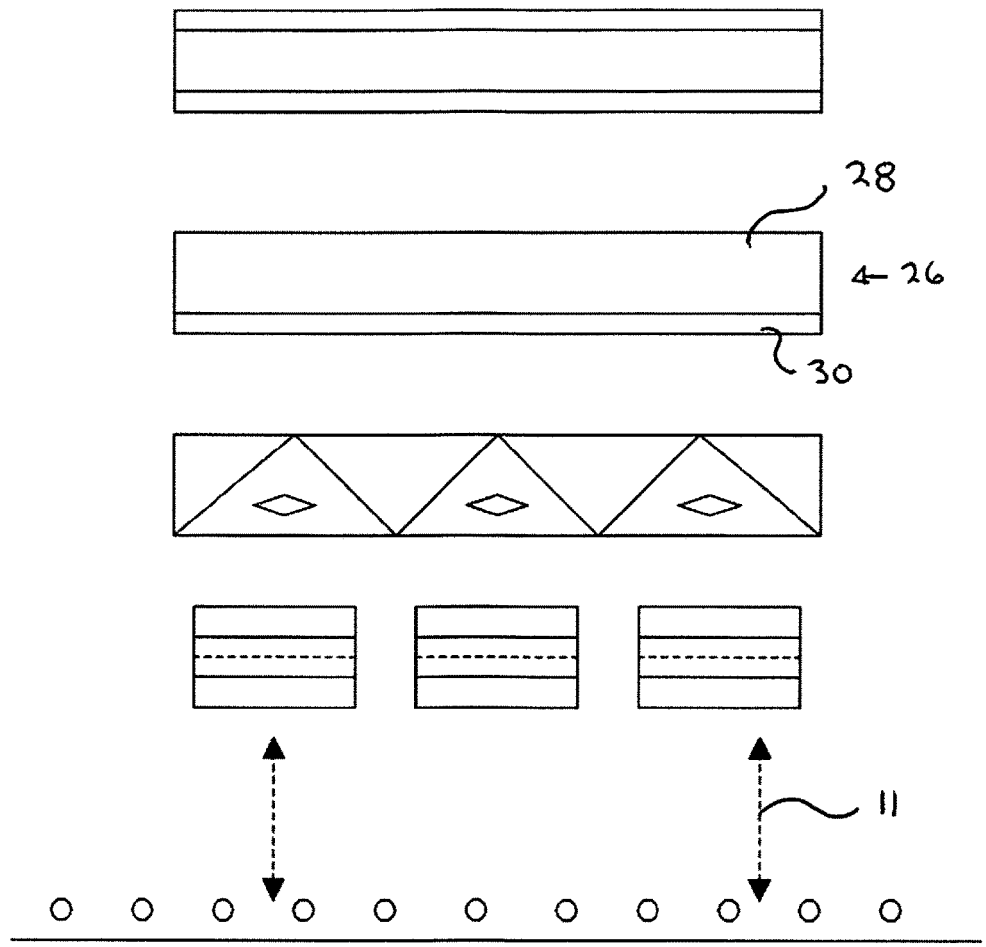
FIG. 3 is a side exploded cross sectional view of the alternate embodiment pet microclimate controlling substrate layers positioned above an animal's fur.

Looking at FIG. 3 it can be seen that the first layer 4, the second layer 6 and the third layer 8 are connected together about (or adjacent) their perimeter edge by a seam member 25. In the preferred embodiment, this seam member is accomplished by turning in the perimeter edges of each layer, placing them atop each other and thread stitching them together a very short distance from their turned in edges. (Approximately ¼" or less.) Preferably the thread is nylon or polymer. In this type of joining the layers, the various layers are loosely in surface contact. The seam member may be chosen from any of a plethora of known seaming technologies such as, seam sealing, hot melt facing sealing, gluing, electrostatic welding, heat welding, stapling and the equivalent although in the preferred embodiment it is thread stitching.

Figure 4:
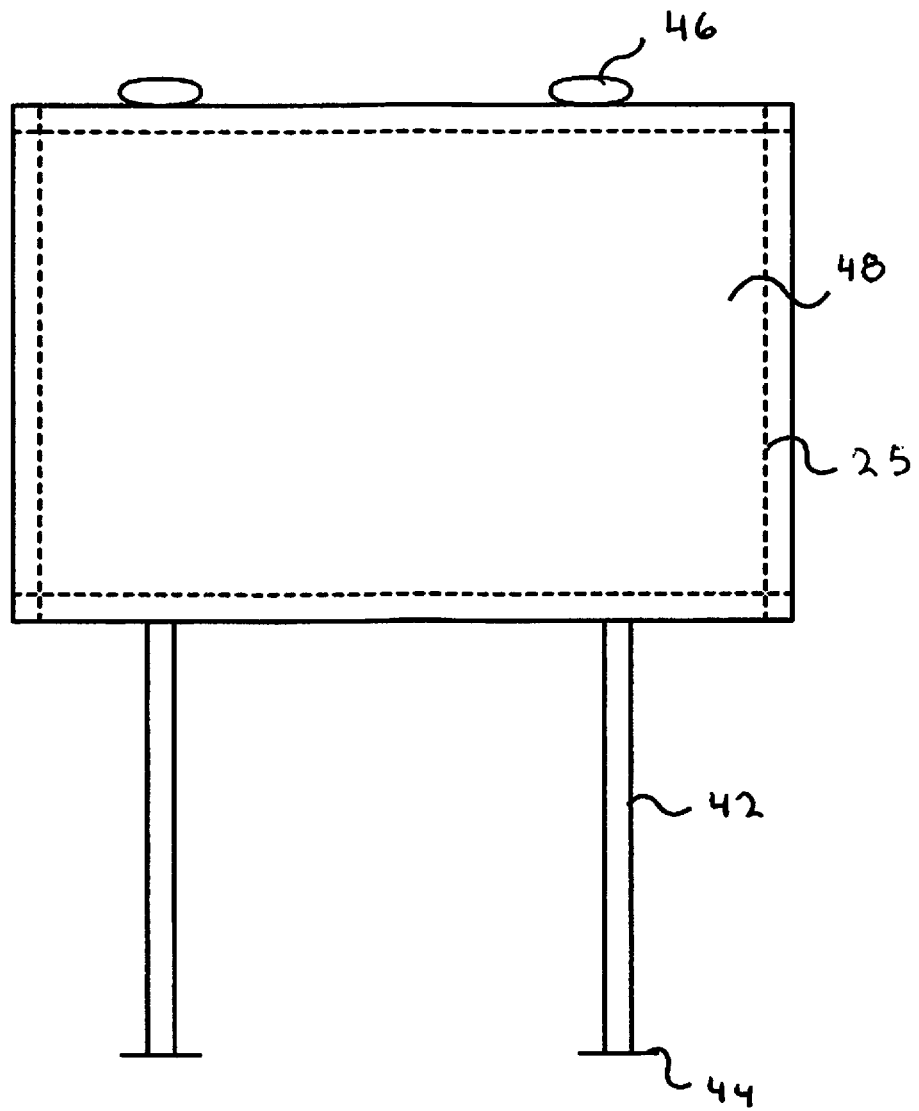
FIG. 4 is a top view of an animal garment.

In operation, (FIGS. 4 and 5) the preferred embodiment is a garment 48 made of the flexible planar sheet of three layered flexible fabrics 48 as described herein, joined together by a seam member 25 along or adjacent the garment's peripheral edge. There is a plethora of garment designs that allow the planar sheet to be removeably affixed to the animal. Commonly, it may just incorporate a series of removeable or adjustable straps 42 with a first half connecting member 44 affixed thereon that matingly attaches to a second half connecting member 46 affixed at another location on the garment 48. These connecting members may be any of the commonly known and used fabric connectors such as hook and loop fasteners, dome fasteners, magnetic fasteners, safety pin fasteners, hook and catch fasteners, spring clamp fasteners and the like. The straps can span across the width of the animal's underbody traversing between the opposing sides of the animal to affix the garment onto the top of the animal's back. The strap may be releasable or fixed and of an elastic nature. (When used to regulate microclimates in individuals or other animals it may be formed into a planar strip so as to form a headband or a neckband.) In its simplest form it will have at least one strap extending from a first edge of the planar sheet across the planar sheet that is connectable to a second edge of the planar sheet.

One of the uses of the garment 48 is for cooling a dog at a dog show and keeping his coat dry. Here the dog is in a room surrounded by many other animals. Their stress level is high and they are warm. Their coat has been shampooed and brushed out. It is of the desired show texture. It is not desirable to get the fur wet again prior to showing the animal. The owner wants to keep the dog cool without wetting its coat or skin. The owner also wants the humidity level at the dog's fur to remain the same as the ambient atmosphere so the dog's fur does not curl or frizz. The ambient temperature of the air in the room is lower than the skin temperature of the dog. The description below details how the microclimate controlling substrate works.

Figure 5:
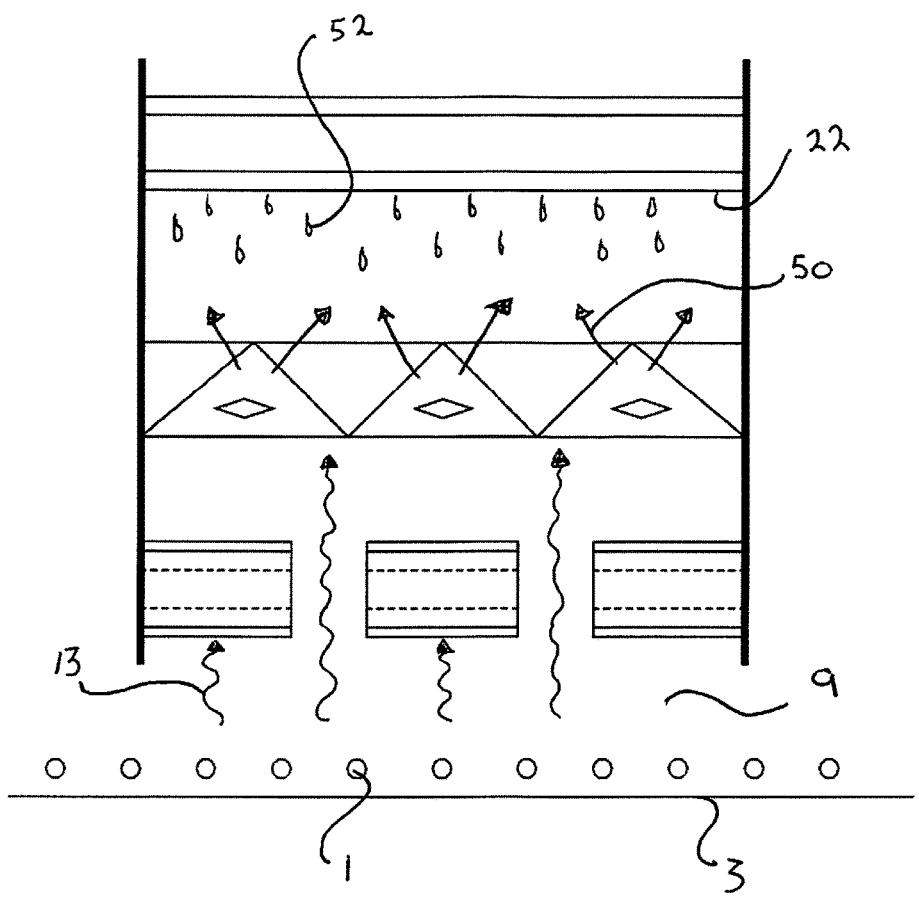
FIG. 5 is a side cross sectional view of operation the preferred embodiment.

For the purpose of controlling the microclimate between the animal's skin 3 and the smooth, wicking, lower inner face 10 of the first layer 4 of the substrate 2, the assembled garment 48 is soaked in water until the second layer 6 has absorbed and retained the maximum amount of water. The exterior of the garment 48 is wiped dry to remove any excess surface water. The garment 48 is placed on the animal's back so its first layer's inner face 10 lies along the animal's fur hairs 1 leaving a space between the garment 48 and the animal's skin. It is in this gap 9 that the microclimate exists. (FIG. 5 shows this operating position but with the layers separated and the microclimate gap 9 enlarged for purposes of explanation.)

The first layer 4 allows convective, radiant and conductive heat 13 to travel from the dog's skin 3 past its fur 1 and then through this first layer 4 passing upward, only minimally hampered. (Note, that the first layer has its wicking side adjacent the dog's fur.) There is a small air gap created between the outer, upper mesh layer 13 of the first layer 4 and the bottom face of the middle 6 layer, creating an air layer. The first layer 4 prevents contact between the wet second layer 6 and the animal's fur keeping the fur dry. The heat from the animal's skin rising upward and passing through the first layer 4 warms the second layer 6 such that the water held in the second poly yarn layer and on/in the activated carbon warms such that the vapor pressure of the water rises and the water begins to evaporate. Because of the massive amount of surface area in the second layer 6, the water is spread out and held at a lower depth per unit of surface area. Thus, there is more heated mass beneath the water molecules and the water is spread out further so as to contact more upward moving heat. This allows evaporation to proceed at an enhanced rate.

The activated carbon in the poly yarn fabric evaporates the water held up therein up to five times greater than that of a smooth, non-activated surface. The warmed vapor 50 rises through this second layer 6, leaving the odors, bacterial and microbes behind trapped in the activated carbon's pores. The act of evaporation through the latent heat of vaporization (phase change) drops the air temperature below the second layer keeping the microclimate area at a cool temperature and preventing heat buildup there. Since hot air rises, the warm evaporated water from the second layer 6 migrates upward until it reaches the third layer 8 of the substrate 2.

Since the bottom face 22 of the third layer 8 has a 0.5 mm polyurethane water proof coating, the rising warm water vapor 50 cannot penetrate this third layer 8 and cannot rise further. The third layer is the densest of the three layers and has the highest thermal conductivity. Since it is in contact with the outside ambient air, this dense layer is at the lowest temperature of the layers in the substrate. The warm water vapor contacts this bottom face and condenses on the cool surface until it forms water droplets 52 that are adsorbed back into the second layer 6. This replenishes the water held in the poly yarn of the second layer so the process can repeat itself. Any water or moisture that reaches the dog's fur will be wicked away by the smooth, wicking face of the first layer. This is an important feature to keep the dog's coat dry.

Simply stated, the garment removes the heat upward from the animal's skin while generating cooler air at the bottom of the second layer 6 that drops through the first layer into the microclimate region maintaining its microclimate temperature level. The moisture is driven upwards as warmed vapor 50 and as condensed vapor (water droplets 50) it is moved downward yet prevented from moving lower than the second layer by its hydrophilic properties, thus maintaining the microclimate humidity level. Since the outer face of the third layer is water resistant, the system continues to work when walking the dog in the rain.

When used on garments for humans there is an added benefit. Humans have pores in their skin and thus sweat. This second layer of the substrate actually is capable of drawing away the sweat at the vapor stage before it can form liquid sweat droplets form of the human's skin surface because of its massive hydrophilic capability This keeps the skin dry (controls the humidity of the microclimate) and still provides the cooling effect (controls the temperature of the microclimate) as the heat emitted evaporates the water absorbed in the activated carbon of the second layer as discussed above.

There is a fourth optional layer 26 in an alternate embodiment substrate used primarily for the maintenance of the dog's body heat although it could also be utilized for cooling in the same fashion as described above. That fourth layer 26 is a breathable polypropylene based non-woven perforated, puncture resistant fabric layer 28 that is metallized 30 on one face. The metalized face 30 can reflect 95% of the infrared energy that reaches it. The metalized face is placed adjacent the top outermost layer of the second middle layer 6.

Figure 6:
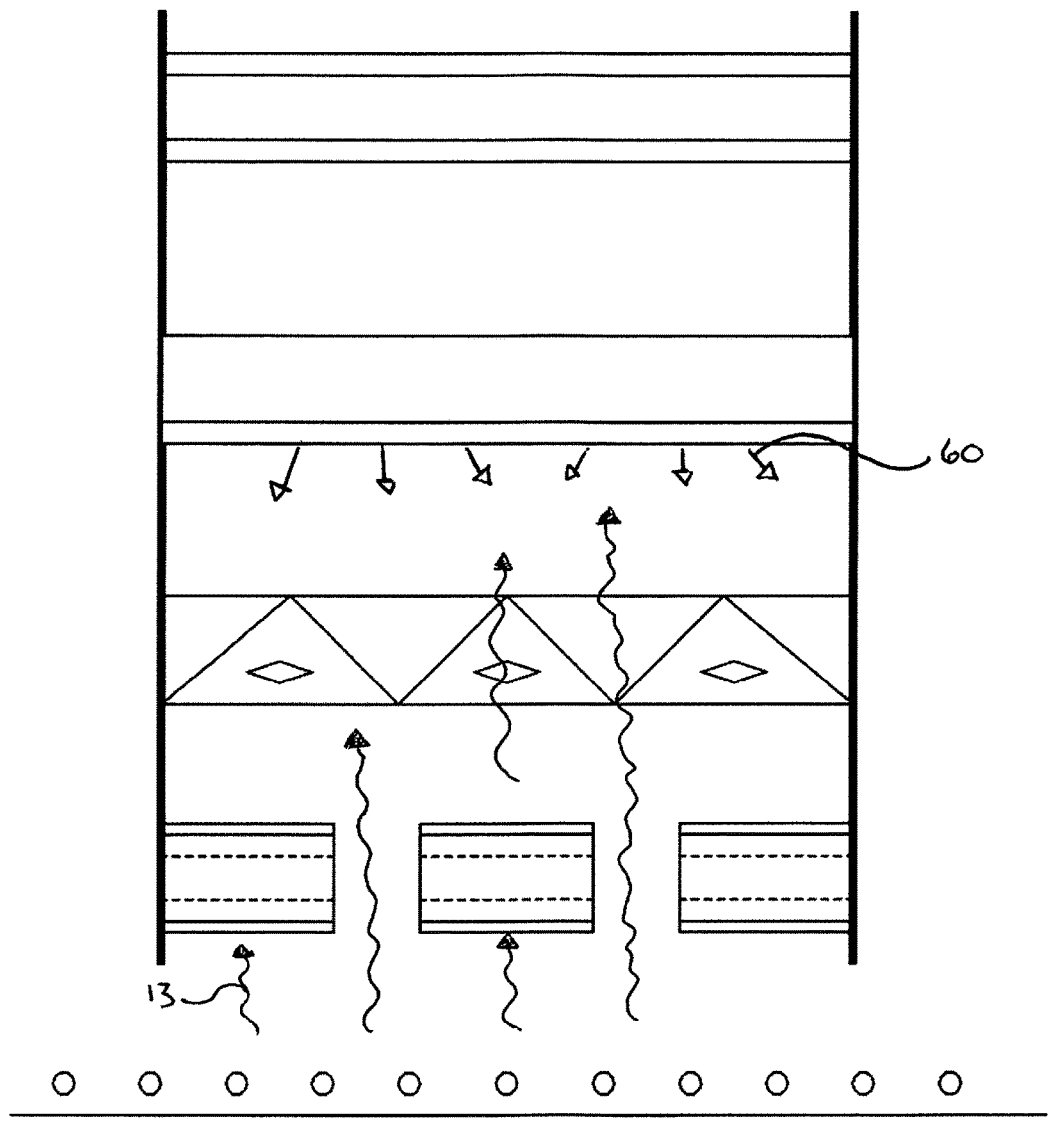
FIG. 6 is a side cross sectional view of the operation of the alternate embodiment.

In operation with this fourth layer, (see FIG. 6) the animal garment is designed to trap the heat emanating from the animal's fur and reduce any of the dog odors. The heat 13 from the dog's skin rises and passes through the first layer 3 and the second layer 6. In the second layer any of the animal related odors are captured in the pores of the activated carbon. Since both the first and second layers are porous woven fabrics even the convective heat freely passes through. Some of the heat is retained in the material of the second layer. The majority of the heat reaching the metalized, non-porous face 30 is reflected back downward again heating the second layer. This second layer then acts as a thermal mass blanket to retain much of the heat lost by the animal. The heat from this second layer 6 is driven down between the animal's skin and the garment in the microclimate zone. The heat that does get beyond the metalized face, warms the dense nylon layer above which then acts as a top blanket on the garment to help hold the heat in.

While certain features and aspects have been described with respect to exemplary embodiments, one skilled in the art will recognize that numerous modifications are possible. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

The invention claimed is:

1. A substrate for construction of a garment for controlling the underlying microclimate of a human or animal, comprising:
    a first layer, said first layer being a polymer fabric having a smooth, moisture wicking lower inner face, a porous polymer central core and an upper mesh layer superimposed onto each other;
    a second layer; said second layer being hydrophilic fiber poly yarn;
    a third layer; said third layer being a non-porous nylon core with a water impermeable polyurethane coating applied to a bottom face; and
    wherein said layers have identical areas and geometric configurations, and are joined together at or adjacent a peripheral edge by a seam member.

2. The substrate for construction of a garment of claim 1 wherein said central core of said first layer has more than 3000 mesh openings per square inch and an evenly spaced repeating array of oval pores formed there through said first layer.

3. The substrate for construction of a garment of claim 1 wherein said second layer is made of a poly yarn fibre selected from the set of poly yarns including polyurethane and ePTFE fiber and wherein approximately a first half of said poly yarn is infused with activated carbon particles from coconut shells and wherein approximately a second half of said poly yarn is untreated, said two halves are woven together to form a seamless combination weave.

4. The substrate for construction of a garment of claim 1 wherein said third layer nylon core is formed in an oxford weave with a smooth outer face, and wherein said bottom face polyurethane coating is approximately 0.5 mm thick and a top face of said third layer has a water-resistant surface treatment applied thereto.

5. The substrate for construction of a garment of claim 1 wherein said seam member is stitched thread.

6. The substrate for construction of a garment of claim 1 further comprising a fourth layer, said fourth layer positioned between said second and said third layers, said fourth layer is a breathable polypropylene based non-woven perforated, puncture resistant fabric layer that is metallized on a bottom face.

7. The substrate for construction of a garment of claim 3 wherein said central core of said first layer has more than 3000 mesh openings per square inch and an evenly spaced repeating array of oval pores formed there through said first layer.

8. The substrate for construction of a garment of claim 7 wherein said second layer is made of a poly yarn fibre selected from the set of poly yarns including polyurethane and ePTFE fiber and wherein approximately a first half of said poly yarn is infused with activated carbon particles from coconut shells and wherein approximately a second half of said poly yarn is untreated, said two halves are woven together to form a seamless combination weave.

9. The substrate for construction of a garment of claim 8 wherein said third layer nylon core is formed in an oxford weave with a smooth outer face, and wherein said bottom face polyurethane coating is approximately 0.5 mm thick and a top face of said third layer has a water-resistant surface treatment applied thereto.

10. The substrate for construction of a garment of claim 9 wherein said seam member is stitched thread.

11. A garment for controlling an underlying microclimate comprising:
    a flexible planar sheet having at least a first layer fabric, a second layer fabric and a third layer fabric, said second layer fabric disposed between said first layer fabric and said third layer fabric, wherein all fabric layers have an identical area and geometric configuration, said layers joined together adjacent a peripheral edge by stitched thread,
        at least one strap extending from a first edge of said planar sheet across said planar sheet and connectable to a second edge of said planar sheet;
    wherein said first layer being a polymer fabric having a smooth, lower inner face, a porous polymer central core and an upper mesh layer all woven together and with an evenly spaced repeating array of oval pores formed there through; and
    wherein said second layer is a hydrophilic fiber poly yarn selected from the set of poly yarns including polyurethane and ePTFE fiber, where approximately an approximate first half of said poly yarn is infused with activated carbon particles from coconut shells and an approximate second half of said poly yarn is untreated, said first and second halves woven together to form a seamless combination weave; and
    wherein said third layer is a non-porous nylon core formed in an oxford weave with a smooth outer face, and with an approximate 0.5 mm thick water impermeable polyurethane coating applied to a bottom face and a water-resistant surface treatment applied thereto a top face.

* * * * *